United States Patent
Yoon et al.

(10) Patent No.: US 6,956,315 B2
(45) Date of Patent: Oct. 18, 2005

(54) STATOR FOR RECIPROCATING MOTOR

(75) Inventors: Hyung-Pyo Yoon, Changwon (KR); Si-Hang Jeon, Busan (KR); Jin-Yeong Do, Changwon (KR); Hyeong-Suk Kim, Changwon (KR); Kyeong-Bae Park, Gwangyoung (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 10/474,985
(22) PCT Filed: May 25, 2001
(86) PCT No.: PCT/KR01/00879

§ 371 (c)(1),
(2), (4) Date: Oct. 15, 2003

(87) PCT Pub. No.: WO02/087059

PCT Pub. Date: Oct. 31, 2002

(65) Prior Publication Data

US 2004/0108774 A1 Jun. 10, 2004

(30) Foreign Application Priority Data

Apr. 19, 2001 (KR) ......................................... 2001-21164

(51) Int. Cl.$^7$ ................................................. H02K 1/12
(52) U.S. Cl. ......................... 310/254; 310/12; 310/14; 310/15
(58) Field of Search ............................. 310/15, 14, 12, 310/254

(56) References Cited

U.S. PATENT DOCUMENTS

| | | | | |
|---|---|---|---|---|
| 4,827,163 A | * | 5/1989 | Bhate et al. ................... 310/15 |
| 4,937,481 A | * | 6/1990 | Vitale ........................... 310/15 |
| 6,060,810 A | * | 5/2000 | Lee et al. ..................... 310/254 |
| 6,153,951 A | * | 11/2000 | Morita et al. ................. 310/12 |
| 6,329,728 B1 | * | 12/2001 | Kitazawa et al. ............. 310/14 |
| 6,573,624 B2 | * | 6/2003 | Park ............................. 310/12 |
| 6,628,018 B2 | * | 9/2003 | Song et al. ................... 310/15 |

FOREIGN PATENT DOCUMENTS

| JP | 8322231 | | 12/1996 | |
|---|---|---|---|---|
| KR | 2003066154 A | * | 8/2003 | .......... H02K/41/02 |

OTHER PUBLICATIONS

Patent Abstracts of Japan, vol. 97, N 04 Apr. 30, 1997.

International Search Report.

* cited by examiner

*Primary Examiner*—Joseph Waks
(74) *Attorney, Agent, or Firm*—Ostrolenk, Faber, Gerb & Soffen, LLP (57) ABSTRACT

A stator for a reciprocating motor includes a bobbin made of an insulating material in which a winding coil is located; a terminal unit forming a single body with the bobbin and connecting the winding coil electrically with an outer power source; and a core unit stacked radially along with the bobbin started from one side of the terminal unit. Therefore, the winding coil and the bobbin can be coupled in simple way, and the core unit can be stacked simply and precisely, so the mass productivity of the motor is able to be increased. Also, the size of the core unit is able to be managed simply and precisely, and then, the contact and impact with other components constructing the motor is prevented, whereby the reliability of the motor can be improved.

18 Claims, 5 Drawing Sheets

STATOR FOR RECIPROCATING MOTOR

TECHNICAL FIELD

The present invention relates to a stator for a reciprocating motor, and particularly, to a stator for reciprocating motor which is suitable for mass product by manufacturing and assembling components in simple way, and by managing the size of components precisely.

BACKGROUND ART

Generally, a motor is an apparatus which changes electric energy into kinetic energy, and it is classified into a rotating type motor which changes the electric energy into rotational motion and a reciprocating motor which changes the electric energy into linear reciprocating motion.

The motor is used in many ways as a power source. Especially, it is installed in almost electric appliances such as refrigerator, air conditioner, washing machine, and electric fan, etc. In case of refrigerator and air conditioner, it is able to be used to rotate a blast fan, but also used as a power source by being installed on a compressor in a refrigerating cycle device constituting the refrigerator and the air conditioner.

Figure 1:
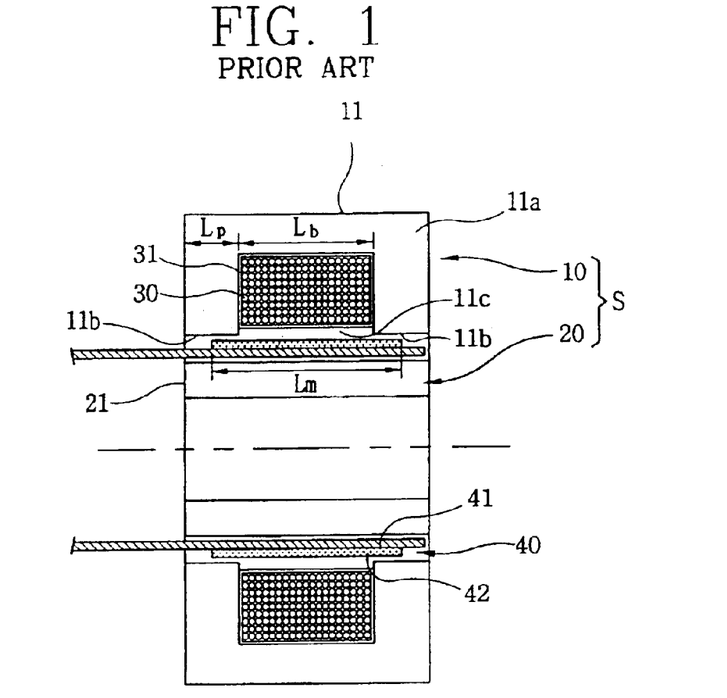
FIG. 1 is a front sectional view of conventional reciprocating motor.

FIG. 1 shows an embodiment of a conventional reciprocating motor. As shown therein, the reciprocating motor comprises a stator (S) includes a cylindrical outer core 10 and an inner core 20 inserted with a certain gap from the outer core 10; a winding coil 30 coupled to the outer core 10 or to the inner core 20; and an armature 40 inserted between the outer core 10 and the inner core 20 so as to be capable of performing linear reciprocating movement.

FIG. 1 shows the structure that the winding coil 30 is coupled to the outer core 10.

The outer core 10 is formed as a cylindrical laminated body by stacking radially a plurality of lamination sheets 11 formed as "U"-shaped thin plates having a certain width so as to make a cylinder shape.

The "U"-shaped part of the lamination sheet 11 is a pass unit 11a on which a flux flows, both ends of the lamination sheet 11 are pole units 11b forming the poles, and an opened space formed inside the pass unit 11a is an opened unit 11c on which the winding coil 30 is located.

The winding coil 30 is formed so that the shape of its profile is corresponded with that of the opened unit 11c by winding the coil a plurality of times so as to make an annular shape. On outer circumference surface of the winding coil 30, an insulation coating film 31 is formed.

The inner core 20 is formed as a cylindrical laminated body by radially stacking the lamination sheet 21 formed as a square thin plate having a same length as that of the outer core 10.

The armature 40 includes a cylindrical magnet holder 41 inserted between the outer core 10 and the inner core 20, and a plurality of permanent magnets 42 fixedly coupled to the outer surface of the magnet holder 41.

The winding coil 30 and the outer core 10 is coupled as follows, that is, the insulation coating film 31 is coated on outer side of the winding coils 30 wound a coil a plurality of times so as to make an annular form, and in that state, the lamination sheet 11 constructing the outer core 10 coupled to the winding coil by being stacked radially on the winding coil 30.

At that time, the lamination sheet 11 is stacked on the winding coil 30 so that the winding coil 30 is inserted inside the opened unit 11c.

The length of the permanent magnets 42 (Lm) is usually same as the length of the pole unit (Lp) added with the length between the poles (Lb). Therefore, the length of the permanent magnets 42 is in proportion to the length between the poles located on both ends of the opened unit 11c, that is, the length between the poles (Lb), therefore the shorter the length between the poles (Lb), the shorter the length of the permanent magnets 42 (Lm). The length of the pole unit (Lp) is corresponded to the stroke, and the length between the poles (Lb) is corresponded to the width of entrance of the opened unit 11c.

Figure 2:
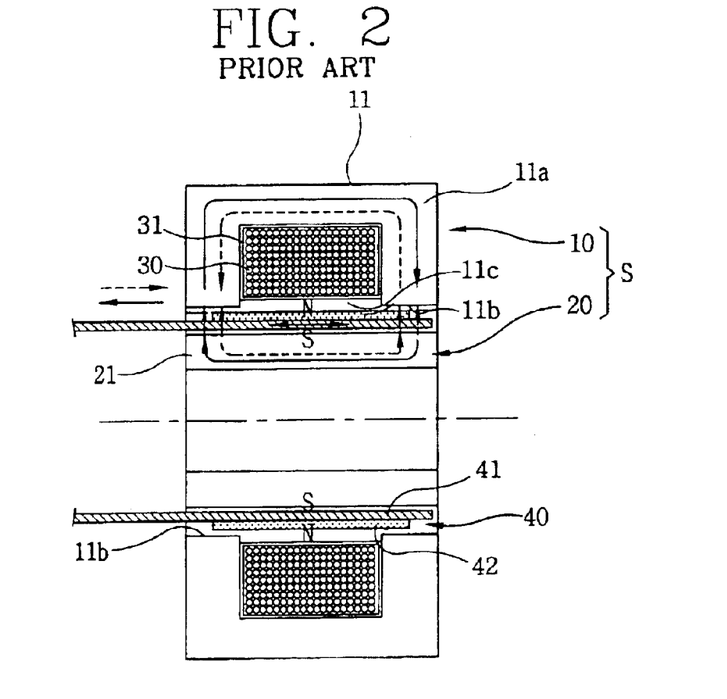
FIG. 2 is a front sectional view showing an operational state of the conventional reciprocating motor.

As shown in FIG. 2, the reciprocating motor described above is operated as follows. First, if the electric current flows on the winding coils 30, a flux is formed around the winding coils 30 by the current flowing on the coils. And the flux flows along with the pass unit 11a of the outer core and the inner core 20 forming the stator (S) as forming a closed loop.

The permanent magnets 42 are moved to the axial direction by the interaction between the flux formed by the electric current flowing on the winding coil 30 and the flux formed by the permanent magnets 42 constituting the armature 40.

In addition, if the flowing direction of the electric current on the winding coil 30 is changed, the direction of the flux formed on the pass unit 11a of the outer core and on the inner core 20 is changed, and the permanent magnets 42 are moved to the opposite direction.

Like above, if the electric current is supplied as changing the direction, the permanent magnets 42 undergoes linear reciprocating motion between the outer core 10 and the inner core 20. Accordingly, the armature 40 generates the driving force of the linear reciprocating motion.

However, in the structure described above, the outer core 10 is constructed as a plurality of lamination sheets 11 is stacked by manual work on the winding coil 30, in the state that insulation coated on the winding coil 30 made by winding a coil having a certain length a plurality of times. Therefore, the winding coil 30 having a same shape as that of the opened unit 11c of the lamination sheet constructing the outer core 10 is difficult to make.

In addition, the winding coil 30 is easy to be distorted, so it becomes difficult to stack the lamination sheet 11, and its size is not to be precise. Therefore, the gap between the outer core 10 and the inner core 20 in which the armature is inserted is not capable of being maintained precisely, whereby the armature 40 is contacted between the outer core and the inner core, and the armature is worn.

Moreover, the width of the entrance of the opened unit 11c on which the winding coil 30 is located, that is, the length between the poles (Lb) is long, and therefore the length of the permanent magnet 42 of high price which is dependant on that of between the poles (Lb), and the amount of the permanent magnet 42 is increased. Thereby, the production cost is increased, and the manufacturing period and the process becomes longer because the lamination sheet 11 is stacked by manual work, so it is not suitable for mass product.

DISCLOSURE OF THE INVENTION

Therefore, it is an object of the present invention to provide a stator for a reciprocating motor which is suitable for mass product by manufacturing and assembling components in simple way, and by managing the size of that components precisely.

To achieve the object of the present invention, there is provided a stator for a reciprocating motor comprising a bobbin made of an insulating material in which the winding coil is located; a terminal unit formed integrally with the bobbin and connecting the winding coil with the outer electric source; and a core unit formed by stacking a plurality of lamination sheets along with the bobbin as started from one surface of the terminal unit.

MODES FOR CARRYING OUT THE PREFERRED EMBODIMENTS

Hereinafter, the stator of the reciprocating motor according to the present invention will be described with reference to the embodiments shown in the accompanying drawings.

Figure 3:
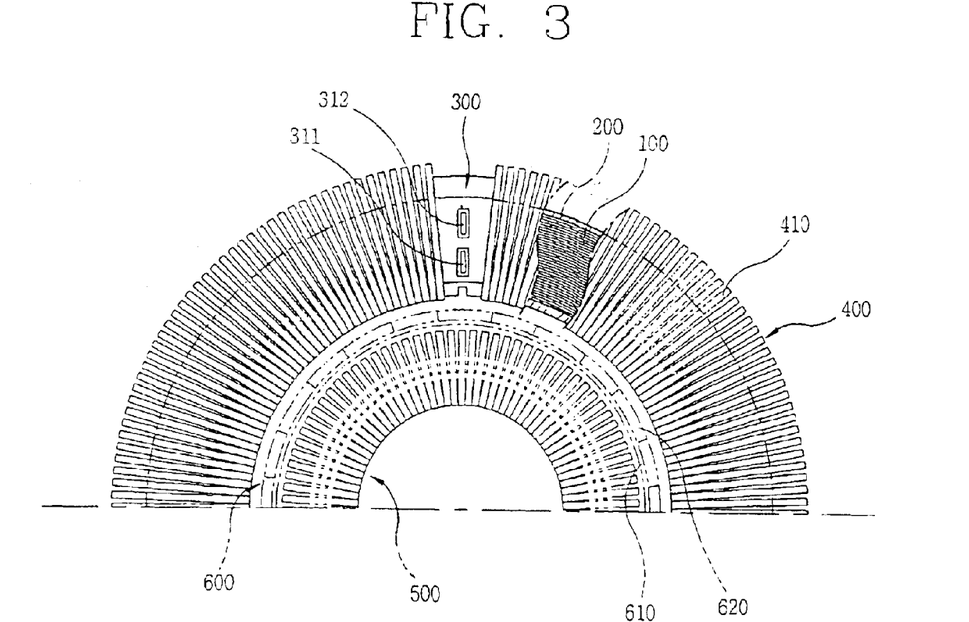
FIG. 3 is a side view showing one embodiment of a reciprocating motor according to the present invention.

FIG. 3 shows an embodiment of the stator of the reciprocating motor according to the present invention. As shown therein, the stator of the reciprocating motor comprises a bobbin 200 made of an insulating material in which the winding coil 100 is located; a terminal unit 300 formed integrally with the bobbin 200 and connecting the winding coil 100 electrically with the outer power source; and core unit 400 formed by stacking a plurality of lamination sheets 410 along with the bobbin 200 started from one side surface of the terminal unit 300.

Figure 4:
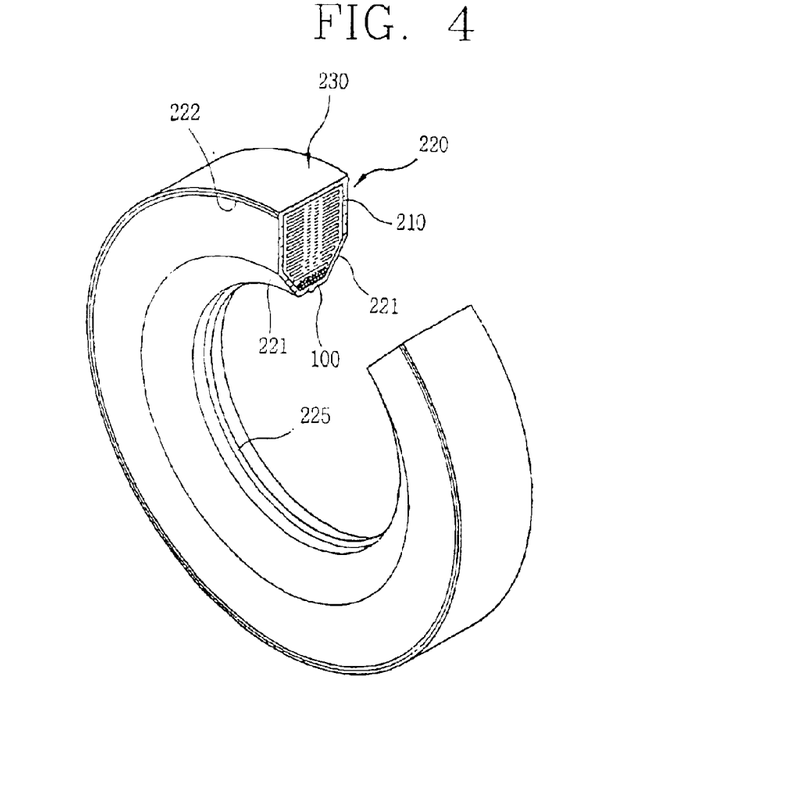
FIG. 4 is a perspective view showing a partially cut-out bobbin of a reciprocating compressor stator according to the present invention.

As shown in FIG. 4, the bobbin 200 is formed as an annular shape, and includes a bobbin body 220 having a winding recess 210 in which the coil is wound inside and a cover 230 coupled integrally with the bobbin body 220 so as to cover the winding recess 210 of the bobbin body 220.

The winding coil 100 is made by winding the coil having a certain length on the winding recess 210 in the bobbin body 220 a plurality of times, and the winding coil 100 is wrapped entirely by the bobbin body 220 and the cover 230.

In addition, sloped parts 221 sloped against the inner surface of the bobbin body 220 are formed on both sides of the bobbin body 220, the bobbin body 220 and the cover 230 are formed so as to maintain a certain thickness.

Moreover, the core unit 400 contacts through the upper surface, both sides surface, and the slopped sloped part 221 of the bobbin 200. On both sides of the bobbin body 220, asperities 222 more than one for fixing the core unit 400 are formed on both lateral sides of the bobbin body 220.

Figure 5:
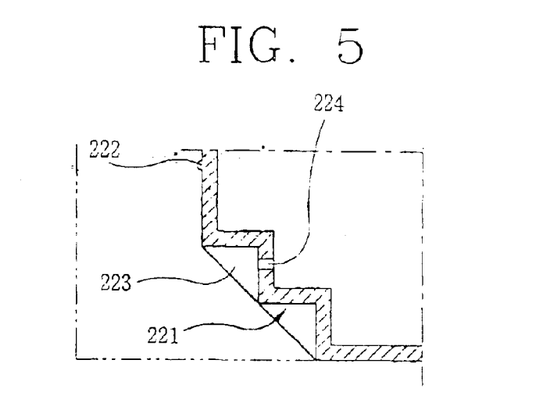
FIG. 5 is a sectional view showing one portion of a body of a bobbin of a reciprocating motor stator according to the present invention.

Another embodiment for the sloped part 221 of the bobbin body 220 is shown in FIG. 5. The sloped part 221 is formed as a step having a certain thickness.

And a plurality of ribs 223 for preventing contraction and distortion are formed on the outer peripheral part of the step.

On the other hand, a discharge hole 224 for discharging the foreign material such as the water is formed on the bobbin 200, and the discharge hole 224 is formed on the place where the core unit 400 is not located. For example, the discharge hole 224 might be formed on the vertical wall of the step-shaped sloped part 221.

In addition, on the inner surface of the bobbin body 220, a guide asperity 225 is formed in the circumferential direction. The guide asperity 225 has a certain width and height, and is formed as an annular form along with the inner peripheral surface of the bobbin body 220. And it is desirable to be formed at central part of the inner peripheral surface.

When the lamination sheet 410 constructing the core unit 400 is stacked on the bobbin 200, a fixing jig (not shown), which fixes the guide asperity, fixes the bobbin 200. As for another example, the guide asperity 225 may be formed as a recess having a certain width and depth so as to fix the fixing jig.

It is desirable that the bobbin 200 is formed with a resin material, that is, the insulating material, and it is more desirable to be formed with a plastic resin among those resin materials.

The terminal unit 300 is formed protrusive extending from the one side of the bobbin 200 so as to have a certain length. And the terminal unit 300 is over molded on one side of the bobbin 200, and the winding recess 210 of the bobbin is included therein.

Figure 6:
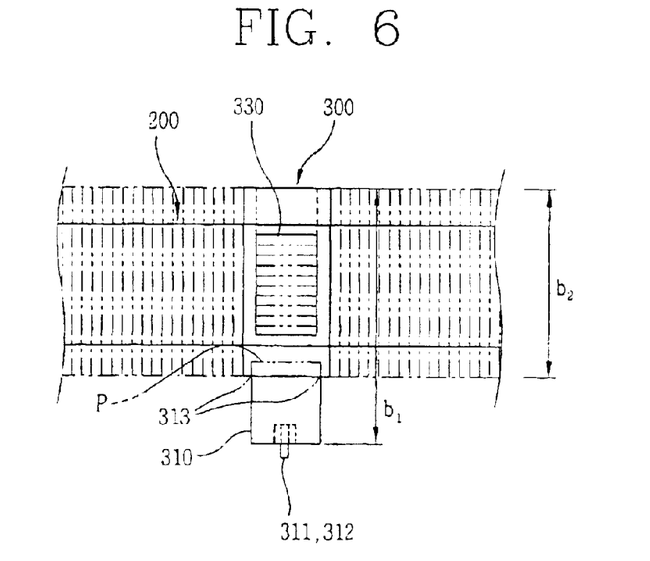
FIG. 6 is a plane view showing a terminal unit of a reciprocating motor stator according to the present invention.

As shown in FIG. 6, the terminal unit 300 is formed in a length direction against the bobbin 200, and the length of the terminal unit 300 (b1) is longer than that of the core unit 400 (b2) stacked on the bobbin 200. The terminal unit 300 includes a connector unit 310 on its one side including a first power source terminal 311 and a second power source terminal 312 protrusive outside.

Figure 7:
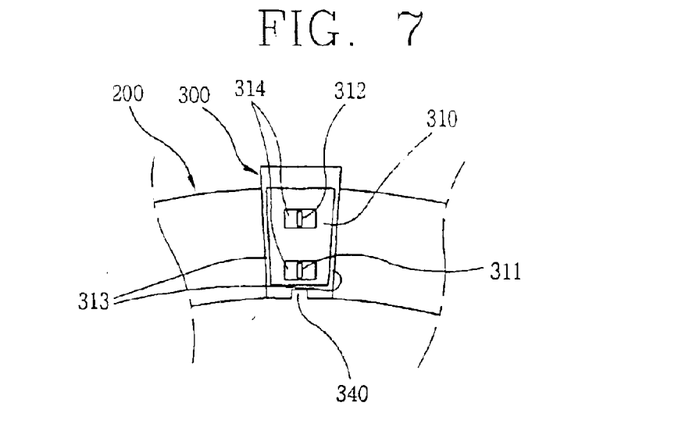
FIG. 7 is a front view showing a terminal unit of a reciprocating motor stator according to the present invention.
Figure 8:
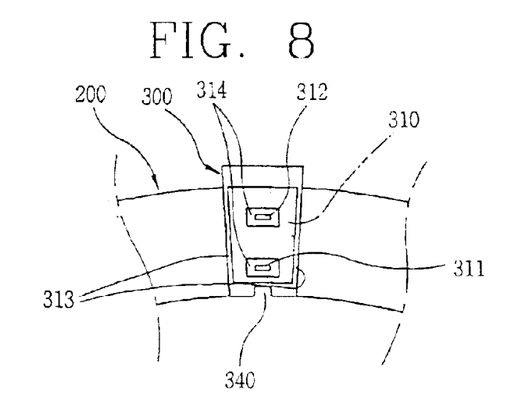
FIG. 8 is a front view showing a modified embodiment of a terminal unit of a reciprocating motor stator according to the present invention.

The first and second power source terminals 311 and 312 are formed so as to have a certain width, thickness, and length. The first power source terminal 311 and the second power source terminal 312 are, as shown in FIG. 7, disposed parallelly to each other in a circumferential direction against radial direction of the bobbin 200. At that time, the first and second power source terminals 311 and 312 are disposed vertically in a straight line against the radial direction, respectively.

The terminal unit 300 is formed using a resin material, and the terminal unit 300 and the connector unit 310 are sequentially molded. And then, a parting line P is generated between the terminal unit 300 and the connector unit 310 by the sequence molding.

In addition, as shown in FIG. 7, the terminal unit 300 and the connector unit 310 are overlapped in the length direction, whereby an overlapped part is formed. On both sides of the overlapped part in the length direction, stepped units 313 are formed respectively, and the connector unit 310 is located between the stepped units 313.

Stepped recesses 314 are formed so as to be located the first power source terminal 311 and the second power 312 located on an end surface of the terminal unit 300, that is, an end surface of the connector unit 310.

Figure 9:
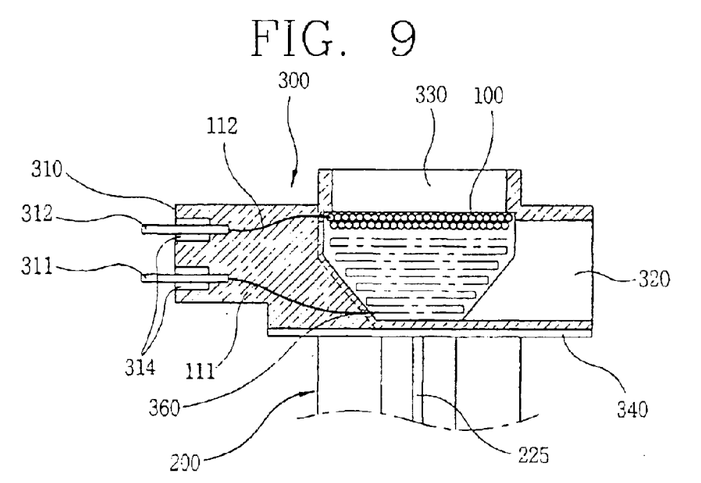
FIG. 9 is a sectional view showing a terminal unit of a reciprocating motor stator according to the present invention.

As shown in FIG. 9, lead wires 111 and 112 connected with the winding coil 100 electrically are included inside the terminal unit 300, and the lead wires 111 and 112 are connected with the first and the second power source terminals, respectively.

The lead wires 111 and 112 are installed as separate wires, these connect the one side end of the winding coil 100 to the first power source terminal 311, and connect the other side end of the winding coil 100 to the second power source terminal 312, respectively.

A recess for emaciation 320 is formed inside the opposite part of the connector unit 310 included in the terminal unit 300 so as to maintain a certain thickness when the terminal unit 300 is molded, and prevent contraction and distortion of the terminal unit 300.

A discharge hole 330 for discharging the foreign material such as the water is formed on the terminal unit 300, and it is formed on a place where is not overlapped with that of the core unit 400. So it is desirable that the discharge hole 330 is formed on outer surface of the terminal unit 300, and the discharge hole 330 is formed by penetrating to have a certain size so that the winding coil 100 located inside the terminal unit 300 is able to be exposed outside.

In addition, a guide recess 340 is formed on inner surface of the terminal unit 300 in an axial direction. The guide recess 340 is formed through in the length direction of the terminal unit 300, and it is formed to have a certain width and depth on a profile of it. The guide recess 340 of the terminal unit 300 is the part which is supported by a separate fixing jig in order to prevent the movement of the bobbin 200 to the radial direction when a plurality of lamination sheets 410 are stacked on the bobbin 200. As for another example of the guide recess 340 of the terminal unit 300, the guide recess 340 may be formed as asperity having a certain height and width.

Figure 10:
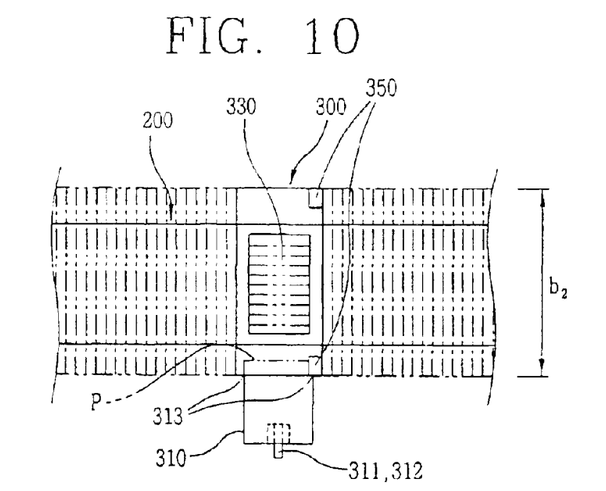
FIG. 10 is a plane view showing a terminal unit of a reciprocating motor stator according to the present invention.

As shown in FIG. 10, a jig holder unit 350 for fixedly supporting the terminal unit 300 and the bobbin 200 using the fixing jig when the core unit 400 is stacked is included in the terminal unit 300.

The jig holder unit 350 is formed by forming the stepped recesses 314 through the both side surfaces and the upper surface of the terminal unit 300 for reducing the width of the terminal unit 300.

A bore 360 for introducing the coil on the both ends of the winding coil 100 into the terminal unit 300, in order to connect the winding coil 100 and the terminal unit 300 electrically, is formed on one side of the bobbin 200. As for another example of the bore, a slot might be formed.

Figure 11:
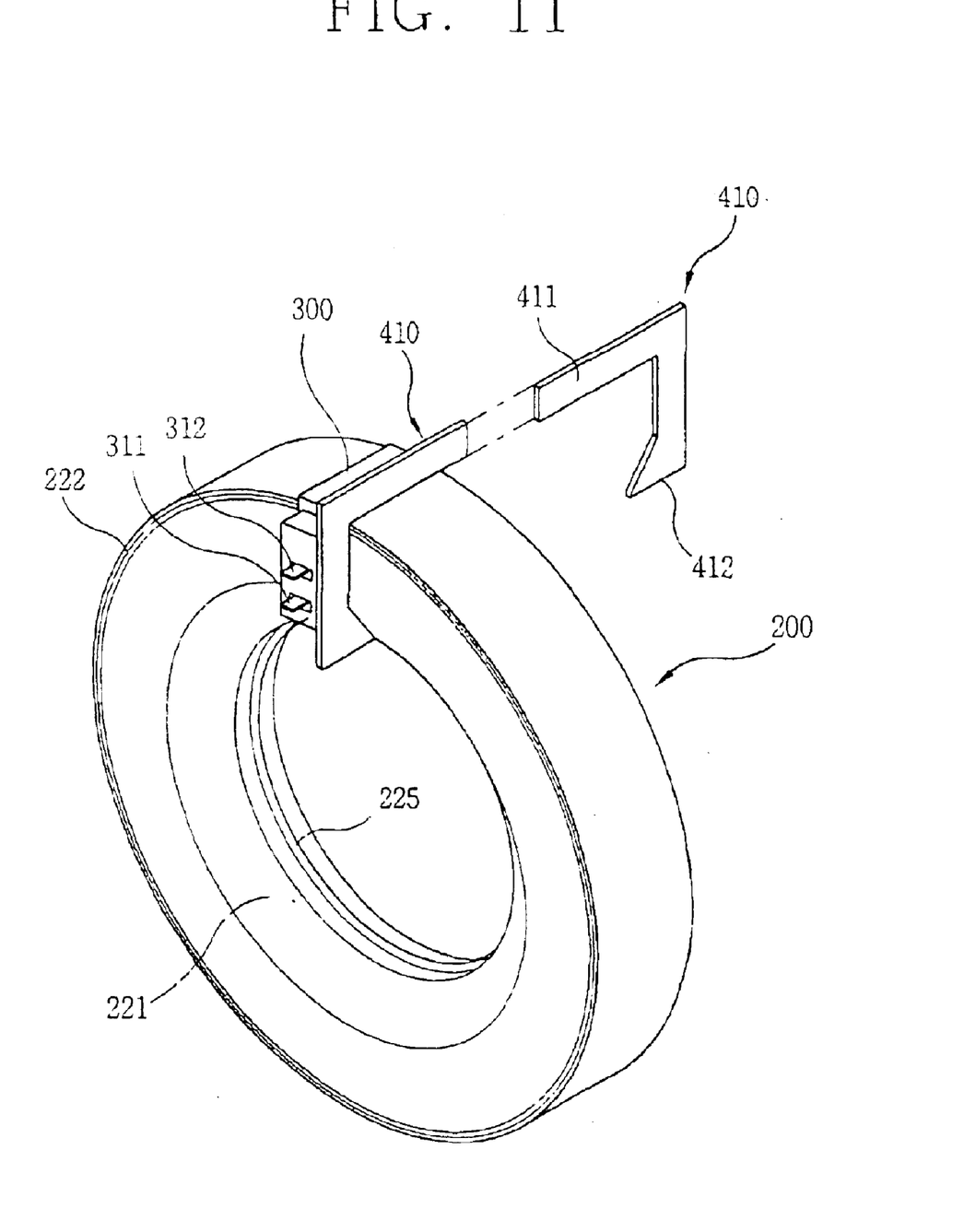
FIG. 11 is a perspective view showing a laminated state of a bobbin and a lamination sheet of a reciprocating motor stator according to the present invention.

The core unit 400 is formed as a laminated body which is made by stacking a plurality of lamination sheets 410 formed as a thin film having a certain form along with the bobbin 200 from one surface of the terminal unit 300 to the other surface of the terminal unit 300.

As shown in the FIG. 11, the lamination sheet 410 constructing the core unit 400 is formed as an "L"-shaped thin film, and the sheets 410 are stacked along with the bobbin 200 in zigzag, alternating with each other.

On the other hand, an inner stator 500 of cylindrical shape is inserted into the stator with a certain gap, the an armature 600 is inserted between the stator and an inner stator 500.

The core unit 400 of the stator, that is, the lamination sheet 410 constructing the core unit 400 is forming a pass unit on which the flux flows, and the inner end of the core unit 400 is forming a pole unit 412 forming the pole.

Also, as shown in FIG. 3, the armature 600 is formed as a cylinder, and includes a magnet holder 610 inserted between the stator and the inner stator 500, and a permanent magnet 620 fixedly coupled to the magnet holder 610 so as to be located between the pole unit 412 and the pole unit 412, that is, between the two poles.

The length of the permanent magnet 620 is the sum of the width of the inner surface of the stator bobbin 200, that is, the distance between the pole units 412 and the length of the pole unit 412.

Hereinafter, the operating effect of the stator of the reciprocating motor according to the present invention will be described as follows.

The reciprocating motor including the stator according to the present invention is operated as follows. That is, when the electric current flows on the winding coil 100, the flux is generated around the winding coil 100 by the electric current flowing on the winding coil 100. And the flux flows along with the core unit 400 of the stator and the inner stator 500, as forming a closed loop.

The permanent magnet 620 is moved to the axial direction by an interaction of the flux caused by the electric current flowing on the winding coil 100 and of the flux caused by the permanent magnet 620 constructing the armature 600. In addition, if the direction of the electric current flowing on the winding coil 100 is changed, the direction of the flux generated on the core unit 400 of the stator and on the inner stator 500 is changed, whereby the permanent magnet 620 moves to the opposite direction.

Like above, if the electric current is supplied as changing the direction of the current, the permanent magnet 620 undergoes the linear reciprocating movement between the stator and the inner stator 500, accordingly, the armature 600 is to be bearing the linear reciprocating driving force.

On the other hand, a method for manufacturing is such that the bobbin body 220 is molded using a resin material, and after that, the winding coil 100 is made by winding a coil a plurality of times on the winding recess 221 formed on the bobbin body 220.

In addition, the cover and the terminal unit 300 are over-molded on the bobbin body 220, on which the winding coil 100 is coupled, using the metal mold method, thereby the bobbin 200 and the terminal unit 300 are molded as a single body.

At that time, the both ends of the winding coil 100 are connected to the first and second power source terminals 311 and 312 located inside the terminal unit 300 respectively, or separate lead wires 111 and 112 connect the both ends of the winding coil 100 to the first and second power source terminals 311 and 312, and these are molded together.

Also, the bobbin 200 and the terminal unit 300 is constructed to have a certain thickness, it is able to reduce the distortion caused by contraction and twist.

In addition, a plurality of the lamination sheets 410 are stacked radially on the bobbin 200 of the coupled body which is made by molding the bobbin 200 and the terminal unit 300 integrally, whereby the core unit 400 is formed.

The process of laminating the lamination sheets 410 on the bobbin 200 will be described. First, the guide asperity 225 formed on the inner surface of the bobbin 200 is fixed by a first fixing jig (not shown) as a fixing point, and at the same time, the guide recess 340 formed the inner surface of the terminal unit 300 by the first fixing jig. After that, the lamination sheets 410 are stacked from the both sides of the bobbin 200 alternatingly while the bobbin 200 is rotated.

At that time, the lamination sheets 410 are stacked started from one surface of the terminal unit 300 to the other surface of the terminal unit 300. In the last step of laminating the sheets, a separate second fixing jig (not shown) fixes the jig holder unit 350 formed on the terminal unit 300, and at the same time, the first fixing jig (not shown) is released, and the last lamination sheet is stacked.

The guide asperity 225 of the bobbin is fixedly supported, accordingly, the coupled body including the bobbin 200 and the terminal unit 300 does not move to the radial direction, and the guide recess 340 of the terminal unit 300 is fixedly supported, accordingly, the coupled body does not move to circumferential direction. Therefore, the lamination work is able to be made in the state the coupled body is fixedly supported.

The first power source terminal 311 and the second power source terminal 312 disposed on one side of the terminal unit 300 are connected to an outer power source terminal (not shown) supplying outer power source. The connector unit 310 including the first and second power source terminals 311 and 312 is more protrusive than the core unit 400, whereby the first and second power source terminals 311 and 312 are easily connected to the outer power source terminal.

Also, the first and second power source terminals 311 and 312 are disposed on end surface of the terminal unit 300 in a straight line with a certain gap, whereby the sufficient distance between the first and second power source terminals 311 and 312 can be obtained. Therefore, assembly processing is able to be made in simple way, the width of the terminal unit 300 is able to be minimized, and therefore the space for lamination of the core unit 400 can be secured.

The bores 224 and 330 are to discharge foreign materials such as water generated in the bobbin 200 or in the terminal unit 300. When a compressor is manufactured by installing the reciprocating motor, a vacuuming process in which the water is removed is made.

At that time, the water included in the bobbin 200, the terminal unit 300 of the stator, and the winding coil 100 is discharged through the holes 224 and 330. If the water included in the bobbin 200, the terminal unit 300, and the winding coil 100 is not discharged totally, the water is to flow on the refrigerating cycle during operating the compressor and is frozen, whereby it may be a reason for blocking the refrigerating cycle or for lowering the efficiency.

Also, in the present invention, the distance between the poles of the core unit 400 is reduced, so the length of the permanent magnet 620 included in the armature 600 is able to be reduced, whereby the amount of the permanent magnet of high price can be reduced.

INDUSTRIAL APPLICABILITY

As described above, according to the reciprocating compressor of the present invention, the coupling process of the winding coil and the bobbin, and the bobbin and the terminal unit can be made in simple way, as well as the coupling of the core unit stacked on the bobbin, whereby mass productivity of the motor can be increased. Also, distortion of the bobbin and the terminal unit is minimized, and therefore managing the sizes of the core unit stacked on the bobbin can be made in simple and precise way, whereby the contact and crush with other components constructing the motor are able to be prevented. Thereby the stability of the motor can be increased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A stator for a reciprocating motor, comprising:

a bobbin made of insulating material, in which a winding coil is located;

a terminal unit formed as a single body with the bobbin and connecting the winding coil with an outer power source electrically; and a core unit made by laminating a plurality of lamination sheets along with the bobbin started on one surface of the terminal unit, wherein the terminal unit is formed protrusively extending toward a length direction of the bobbin, and the length of the terminal unit is longer than that of the core unit stacked on the bobbin and, wherein a connector unit including a first power source terminal and a second power source terminal protruding outside is included on an end of the terminal unit, and wherein the terminal unit and the connector unit are molded sequentially, and a parting line is formed between the terminal unit and the connector unit by the sequential molding.

2. The stator according to claim 1, wherein the bobbin is formed with a resin material which is an insulating material, and formed so as to wrap the winding coil.

3. The stator according to claim 2, wherein both sides of the bobbin have a sloped part.

4. The stator according to claim 1, wherein the first and second power source terminals are disposed parallelly to a circumferential direction against a radial direction of the bobbin.

5. The stator according to claim 1, wherein the terminal unit and the connector unit are overlapped in length direction of the bobbin, whereby an overlapped part is formed.

6. The stator according to claim 5, wherein stepped parts formed on both sides of the overlapped parts in the length direction, and the connector unit is located on central part of the overlapped part.

7. The stator according to claim 1, wherein a lead wire electrically connected with the winding coil is included inside the terminal unit.

8. A stator for a reciprocating motor, comprising:

a bobbin made of insulating material, in which a winding coil is located;

a terminal unit formed as a single body with the bobbin and connecting the winding coil with an outer power source electrically; and a core unit made by laminating a plurality of lamination sheets along with the bobbin started on one surface of the terminal unit, wherein the terminal unit is formed protrusively extending toward a length direction of the bobbin, and the length of the terminal unit is longer than that of the core unit stacked on the bobbin, wherein a discharge hole for discharging foreign material such as water is formed on the terminal unit or on the bobbin.

9. The stator according to claim 8, wherein the discharge hole is formed on one side of the terminal unit or of the bobbin where it is not overlapped with the core unit.

10. The stator according to claim 8, wherein the discharge hole is formed on outer surface of the terminal unit.

11. A stator for a reciprocating motor, comprising:
a bobbin made of insulating material, in which a winding coil is located;
a terminal unit formed as a single body with the bobbin and connecting the winding coil with an outer power source electrically; and
a core unit made by laminating a plurality of lamination sheets along with the bobbin started on one surface of the terminal unit,
wherein the terminal unit is formed protrusively extending toward a length direction of the bobbin, and the length of the terminal unit is longer than that of the core unit stacked on the bobbin, wherein a rib for preventing contraction and twist is formed on the bobbin and the terminal unit.

12. A stator for a reciprocating motor, comprising:
a bobbin made of insulating material, in which a winding coil is located;
a terminal unit formed as a single body with the bobbin and connecting the winding coil with an outer power source electrically; and
a core unit made by laminating a plurality of lamination sheets along with the bobbin started on one surface of the terminal unit,
wherein the terminal unit is formed protrusively extending toward a length direction of the bobbin, and the length of the terminal unit is longer than that of the core unit stacked on the bobbin, wherein a guide recess or an asperity is formed on inner surface of the bobbin forward the circumferential direction.

13. The stator according to claim 12, wherein the guide recess or the asperity is located on center of the inner surface of the bobbin.

14. A stator for a reciprocating motor, comprising:
a bobbin made of insulating material, in which a winding coil is located;
a terminal unit formed as a single body with the bobbin and connecting the winding coil with an outer power source electrically; and
a core unit made by laminating a plurality of lamination sheets along with the bobbin started on one surface of the terminal unit,
wherein the terminal unit is formed protrusively extending toward a length direction of the bobbin, and the length of the terminal unit is longer than that of the core unit stacked on the bobbin, wherein a guide recess or an asperity is formed on inner side of the terminal unit forward an axial direction.

15. A stator for a reciprocating motor, comprising:
a bobbin made of insulating material, in which a winding coil is located;
a terminal unit formed as a single body with the bobbin and connecting the winding coil with an outer power source electrically; and
a core unit made by laminating a plurality of lamination sheets along with the bobbin started on one surface of the terminal unit,
wherein the terminal unit is formed protrusively extending toward a length direction of the bobbin, and the length of the terminal unit is longer than that of the core unit stacked on the bobbin, wherein asperities more than one for fixing the core unit are formed on the bobbin.

16. A stator for a reciprocating motor, comprising:
a bobbin made of insulating material, in which a winding coil is located;
a terminal unit formed as a single body with the bobbin and connecting the winding coil with an outer power source electrically; and
a core unit made by laminating a plurality of lamination sheets along with the bobbin started on one surface of the terminal unit,
wherein the terminal unit is formed protrusively extending toward a length direction of the bobbin, and the length of the terminal unit is longer than that of the core unit stacked on the bobbin, wherein a bore for introducing the coil on both ends of the winding coil into the terminal unit is formed on one side of the bobbin so that the winding coil and the terminal unit are connected electrically.

17. A stator for a reciprocating motor, comprising:
a bobbin made of insulating material, in which a winding coil is located;
a terminal unit formed as a single body with the bobbin and connecting the winding coil with an outer power source electrically; and
a core unit made by laminating a plurality of lamination sheets along with the bobbin started on one surface of the terminal unit,
wherein the terminal unit is formed protrusively extending toward a length direction of the bobbin, and the length of the terminal unit is longer than that of the core unit stacked on the bobbin, wherein a jig holder unit for fixing the terminal unit and the bobbin using a fixing jig when the core unit is stacked on the terminal unit is included.

18. The stator according to claim 17, wherein the jig holder unit is made by forming stepped recesses reducing the width of the terminal unit on both sides of the terminal unit, respectively.

* * * * *